(12) United States Patent
Nebesnak et al.

(10) Patent No.: US 8,153,220 B2
(45) Date of Patent: *Apr. 10, 2012

(54) METALLIC T-JOINT PATCH

(75) Inventors: Edward Nebesnak, Mine Hill, NJ (US); David Amanullah, West Paterson, NJ (US); Harley Cummings, Clinton, OH (US)

(73) Assignee: Building Materials Investment Corporation, Wilmington, DE (US)

( * ) Notice: Subject to any disclaimer, the term of this patent is extended or adjusted under 35 U.S.C. 154(b) by 619 days.

This patent is subject to a terminal disclaimer.

(21) Appl. No.: 11/827,843

(22) Filed: Jul. 12, 2007

(65) Prior Publication Data

US 2008/0086975 A1  Apr. 17, 2008

Related U.S. Application Data

(63) Continuation-in-part of application No. 11/055,148, filed on Feb. 10, 2005, now Pat. No. 7,638,180.

(51) Int. Cl.
*B32B 9/00* (2006.01)
*B32B 3/02* (2006.01)
*E04B 5/00* (2006.01)

(52) U.S. Cl. ............ 428/40.1; 428/40.9; 428/41.1; 428/41.2; 428/41.6; 428/64.1; 428/66.5; 428/80; 52/408; 52/411; 52/412; 52/413

(58) Field of Classification Search ............ 428/40.1, 428/40.9, 41.1, 41.2, 41.6, 64.1, 66.5, 80; 52/408, 411–413
See application file for complete search history.

(56) References Cited

U.S. PATENT DOCUMENTS

| | | | | | |
|---|---|---|---|---|---|
| 3,049,836 | A | * | 8/1962 | Weissman | 206/582 |
| 4,298,642 | A | * | 11/1981 | Walter | 428/40.9 |
| 4,464,427 | A | * | 8/1984 | Barlow | 428/40.3 |
| 5,654,063 | A | * | 8/1997 | Kirk et al. | 428/77 |
| 5,800,891 | A | | 9/1998 | Wasitis | |
| 7,638,180 | B2 | * | 12/2009 | Nebesnak | 428/40.1 |
| 2006/0099370 | A1 | * | 5/2006 | Glass | 428/40.1 |

* cited by examiner

*Primary Examiner* — Patricia Nordmeyer
(74) *Attorney, Agent, or Firm* — Sills Cummins & Gross P.C.

(57) ABSTRACT

A metallic T-joint patch is provided for application to intersecting and overlapping portions of a single ply membrane system of different heights. When applied to the joint formed by the intersecting and overlapping membranes, the metallic joint patch having an adhesive layer conforms to the void formed by the joint and assures a water tight seal. A method of making a metallic joint patch and a method of applying a metallic joint patch to a void formed by intersecting and overlapping membranes are also disclosed.

13 Claims, 6 Drawing Sheets ured in the T-joint formed by the overlapping membranes;
METALLIC T-JOINT PATCH This application is a continuation-in-part of U.S. application Ser. No. 11/055,148, filed on Feb. 10, 2005 now U.S. Pat. No. 7,638,180, the entirety of which is incorporated herein by reference.

FIELD OF THE INVENTION

The present invention relates to roofing materials. More specifically, the present invention is directed to a metallic joint patch to fill voids created by overlapping roofing membranes.

BACKGROUND OF THE INVENTION

Single ply membranes are roofing membranes that are field applied using just one layer of membrane material (either homogeneous or composite) rather than multiple layers. Oftentimes as a result of the overlapping intersection of two, three or four sheets of the membrane, a joint is created.

Current joint patches are either patches of membrane material either heat welded to the intersection of overlapping membranes or pressure sensitive adhesive joint patches of membrane material with the butyl or similar adhesive applied to one side with a release liner. Often, when a patch is applied to intersecting and overlapping portions of a single ply membrane system at the joint (which comprises different heights of overlapping membranes), the adhesive does not conform to the vertical step in height thus causing bridging and leaving a void or channel into which water and debris can enter.

Additionally, the membrane material has a memory which results in pull back as the joint patch is rolled or pressed in, keeping the adhesive from effectively filling the void or channel.

SUMMARY OF THE INVENTION

When roofing membranes intersect or overlap with one another during installation of a roof, joints may be formed at the points of intersection or overlap. A T-joint is a joint formed by the intersection or overlapping of three or four membrane sheets. A butt-joint is a joint formed by adjacent, separate sections of material, such as where two neighboring pieces of roofing membrane abut. The joints formed by the intersection and/or overlapping of roofing membranes can be problematic since the void formed by the joint often permits water to seep into and underneath the roofing membranes, creating a leak in the building envelope.

A joint patch is provided to alleviate the problem inherent in the formation of "joints" formed as a result of the overlapping intersection of sheets in the roofing membrane. In one embodiment, the T-joint patch is ribbed and may be circular, oval, square or rectangle. The patch is comprised of a single ply roofing membrane preferably ranging in diameter from approximately 3 inches to 9 inches. Examples of single ply roofing membranes from which the patch is formed includes, but is not limited to, thermoplastic olefin (TPO), polyvinyl chloride (PVC), ethylene propylene diene terpolymer (EPDM) or chlorosulfonated polyethylene (Hypalon®). The joint patch can be injection molded or fabricated by other conventionally known methods, with a rib or similar design having an approximate height of 20-90 mils on the flat plane of the membrane that will receive a butyl rubber or other type of adhesive compound and a release liner. This design will allow for the adhesive to fill in the void created by the overlapping membranes thus assuring a tight seal.

In another embodiment, the T-joint is comprised of a metallic foil backed with a polymeric film preferably ranging in length from approximately 3 inches to 9 inches. Examples of metallic foil from which the patch is formed includes, but is not limited to, aluminum, copper, magnesium, zinc, nickel, tin, gold, silver, and alloys thereof. The polymeric film is typically a thermoplastic film that includes but is not limited to polyethylene and polypropylene. Alternatively, the metallic foil may be used without a polymer film applied to it where the adhesive imparts sufficient tear strength to the final product.

Accordingly, a roof joint patch is provided, the roof joint patch comprising a flat section of a roofing membrane comprising a metallic foil, the flat section having a first side and a second side, an adhesive waterproofing layer on the first side of the roofing membrane, and a release liner on the adhesive layer.

Further, a method is provided of making a roof joint patch, the method comprising coating a first side of a flat section of a roofing membrane comprising a metallic foil with an adhesive layer, and adding a release liner onto the adhesive layer.

A method of filling a joint void formed by overlapping membranes is also provided, the method comprising the steps of peeling a release liner off a first side of a flat section of a T-joint patch comprising a metallic foil, the flat section having a first side and a second side, positioning the T-joint patch so as to correspond to a T-joint void formed by overlapping membranes on a roofing surface, and applying pressure on a second side of the T-joint patch such that the T-joint patch fills the T-joint void to form a water tight seal.

The joint patch can be fabricated from any commercially available metallic foil with the adhesive applied by a knife over roll coater extruded or by other conventional method, with the adhesive having an approximate thickness of 8-90 mils comprising a butyl rubber or other type of adhesive compound and a release liner. This design will allow for the adhesive to fill in the void created by the overlapping membranes thus assuring a tight seal where the metallic foil will retain the shape of the joint after being rolled in, or alternatively, for the patch to be rolled in so as to kink the metal thereby eliminating pull back due to memory.

DETAILED DESCRIPTION

Figure 1:
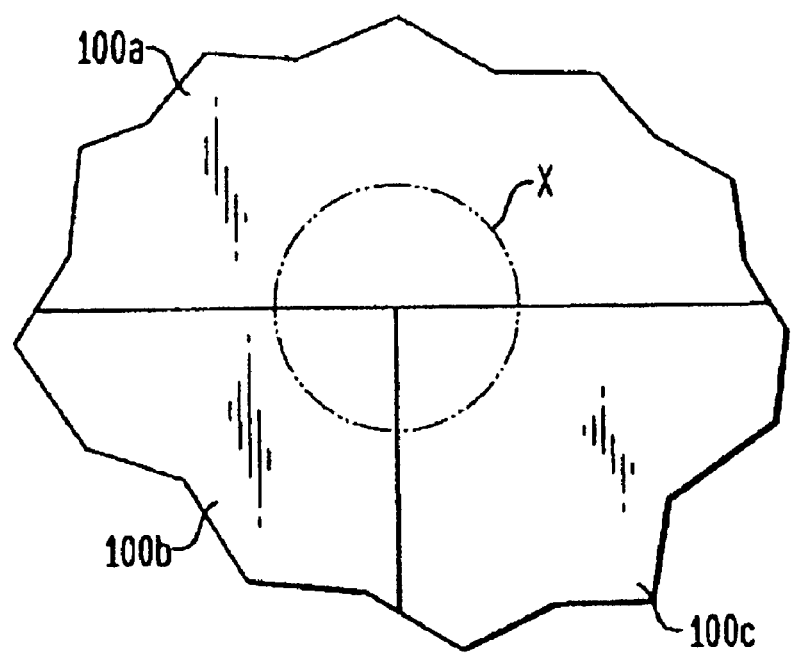
FIG. 1 depicts overlapping membranes forming a T-joint or void.
Figure 2:
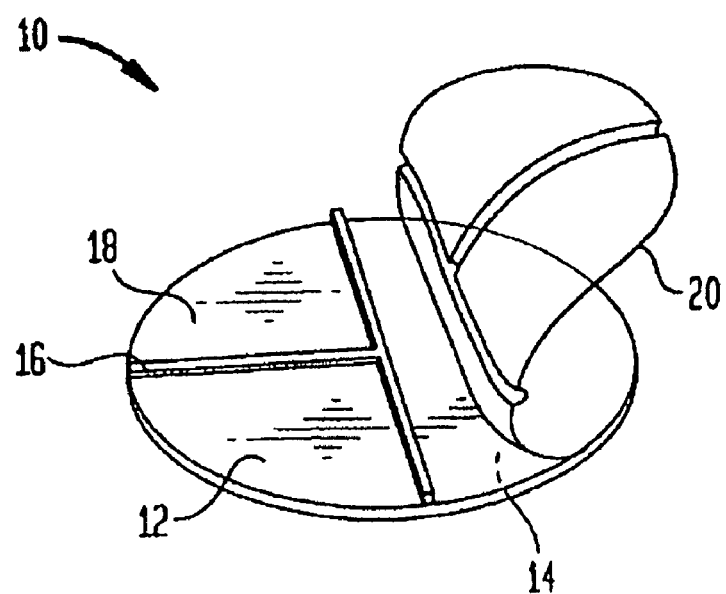
FIG. 2 is a perspective view of a circular T-joint patch in accordance with one embodiment of the present invention.

In FIG. 1, a joint, commonly referred to as a T-joint, (indicated by the circle denoted X) is formed by the intersection of three (3) membranes 100a, 100b, 100c. A first embodiment of the T-joint patch 10 is illustrated in FIG. 2. Patch 10 in one embodiment is circular or oval. Patch 10 is planar and has a first side 12 (roof side) and a second side 14 (weather side). A T-shaped rib 16 is positioned on first side 12. T-shaped rib 16 divides first side 12 of patch 10 into three sections. A layer of adhesive 18 such as a butyl layer or other similar waterproofing adhesive layer, is then coated on T-shaped 16 and first side 12 of patch 10. A release liner 20 is then positioned on first side 12 of patch 10 and conforms to the shape of patch 10. Patch 10 is not limited to a circular or oval shape and may also be square or rectangular.

Figure 3:
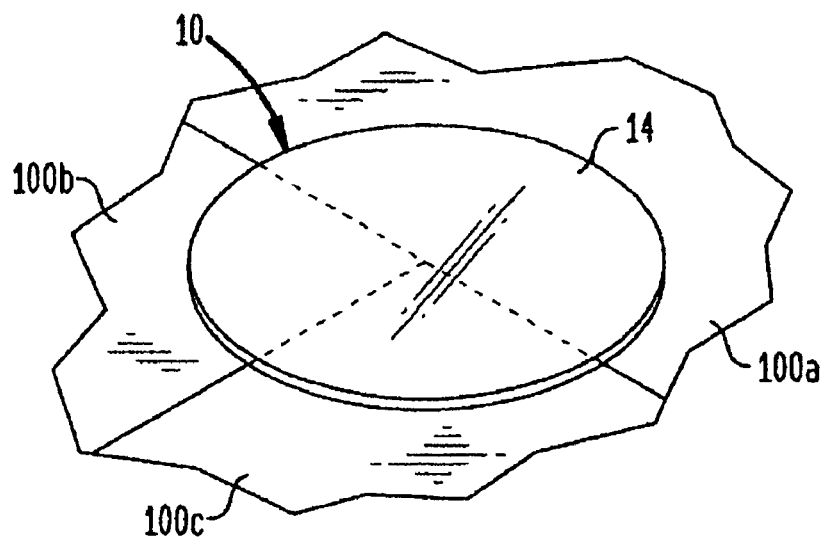
FIG. 3 illustrates a top view of the T-joint patch of FIG. 2 secured in the T-joint formed by the overlapping membranes.
Figure 4:
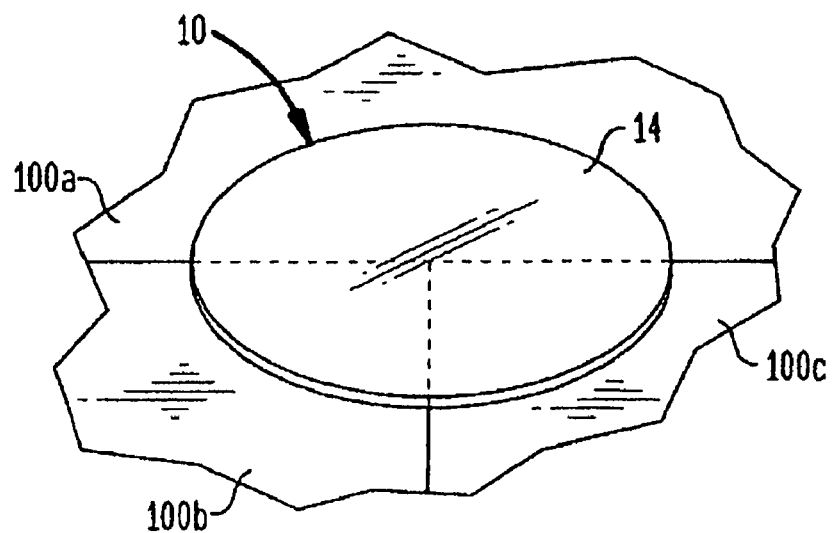
FIG. 4 illustrates another top view of the T-joint patch of FIG. 2 secured in the T-joint formed by the overlapping membranes.

In use, release liner 20 is peeled or removed from first side 12 of patch 10. The T-shaped rib 16 is then positioned to conform with the T-joint formed by the intersection of membranes 100a, 100b, 100c and is fitted in the T-joint. Adhesive layer 18 on first side 12 of patch 10 secures side 12 of patch 10 to membranes 100a, 100b, 100c. To provide a water-tight seal, pressure is usually applied to second side 14 of patch 10. Pressure may be applied by any known means, including the use of a roller or by applying pressure using one's hands. Heat may also be applied to second side 14 of patch 10 to provide a heat seal. FIGS. 3 and 4 illustrate patch 10 applied on membranes 100a, 100b, 100c. T-shaped rib is positioned in T-shaped joint (not visible), and adhesive layer 12 secures first side 12 of patch 10 to membranes 100a, 100b, 100c, leaving second side 14 as the exposed surface.

T-joint patch 10, in one embodiment, is a single ply roofing membrane ranging in size from approximately 3 inches to 9 inches, but the size and shape of the patch is not limited in this respect. Examples of single ply roofing membranes from which patch 10 is formed include thermoplastic olefin (TPO), polyvinyl chloride (PVC), ethylene propylene diene terpolymer (EPDM) or chlorosulfonated polyethylene (Hypalon®). The T-joint patch can be vacuum or injection molded, or fabricated by other conventionally known methods, with a T-shaped rib having an approximate height of 20-90 mils on the flat plane of the membrane that will receive a butyl or other type of adhesive compound and a release liner.

Figure 5:
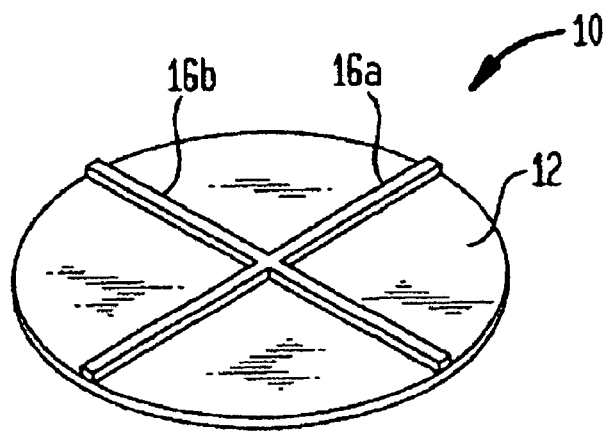
FIG. 5 illustrates a view of the roof side of a joint patch having two ribs which segment the patch into four quadrants.

In a second embodiment illustrated in FIG. 5, joint patch 10 is vacuum or injection molded and segmented (or divided) into four quadrants by intersecting ribs 16, 16b. Each quadrant formed by the intersection of ribs 16a, 16b have a different height and having the same thickness of butyl or other adhesive layer thereon, along with a release liner (not shown).

In a third embodiment, joint patch is segmented into four quadrants as in FIG. 5. In this embodiment, the four quadrants formed by intersecting ribs, combined with the butyl layer (or other adhesive layer), and the release liner, all have a different thickness. The difference in the thickness of the quadrants is to accommodate the differences in height of intersecting roofing membranes, which are oftentimes placed on top of one another such that one or more sides of a of a joint may be higher than other sides.

Figure 6:
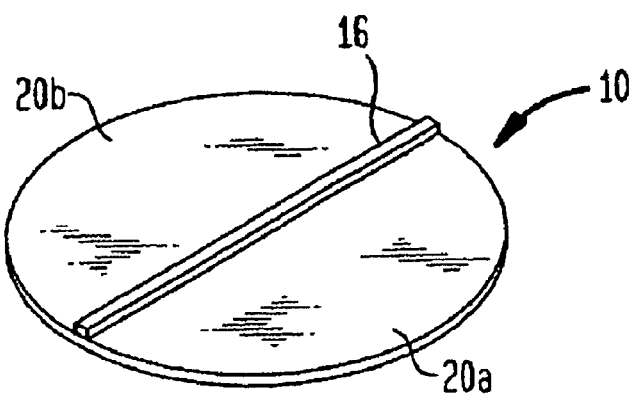
FIG. 6 illustrates a top view of the a joint patch in which a single rib, segmenting the patch into halves, is seen in skeletal view.
Figure 7:
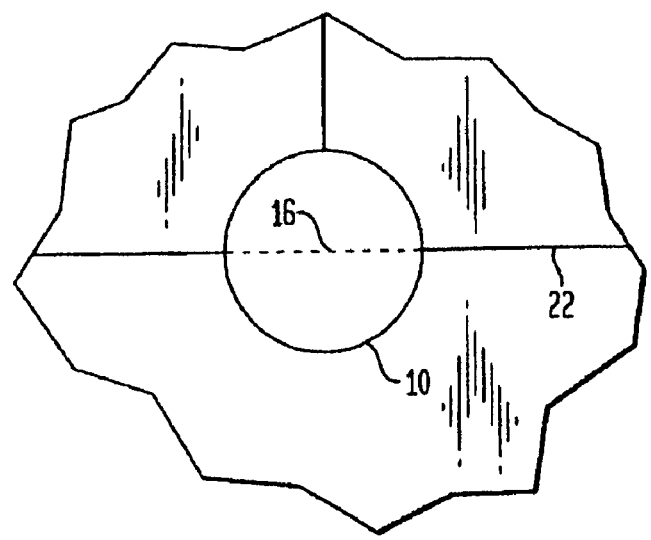
FIG. 7 illustrates a top view of the joint patch of FIG. 6 secured in the joint formed by the overlapping membranes.

In another embodiment illustrated in FIG. 6, a joint patch 10 is segmented into two sections 20a, 20b by a single rib 16. Sections 20a and 20b may or may not be equal halves. Each of sections 20a, 20b are provided with a butyl layer or other adhesive layer, and a release liner. Furthermore, each of sections 20a, 20b has a different thickness. FIG. 7 illustrates joint patch 10 of FIG. 6 applied on membranes 100a, 100b, 100c in a horizontal joint 22.

In another embodiment in accordance with the present invention, patch 10 may be used for sealing a butt joint formed by adjacent, separate sections of material, such as roofing membrane sheets. A butt joint patch generally has a single rib on the deck side of the patch and extending from one side of the patch to the other side, much like patch 10 illustrated in FIGS. 6 and 7. The single rib on the deck side of the patch generally splits butt joint patch into two equal sections, however the invention is not limited in this respect, and rib may divide butt joint patch into unequal sections. As with the other joint patches described herein, the butt joint patch will also be provided on its deck side with a butyl layer or other adhesive layer, and a release liner on the butyl or other adhesive layer. The butt joint patch in accordance with the present invention can be vacuum molded, injection molded or fabricated by other conventionally known methods.

Figure 8:
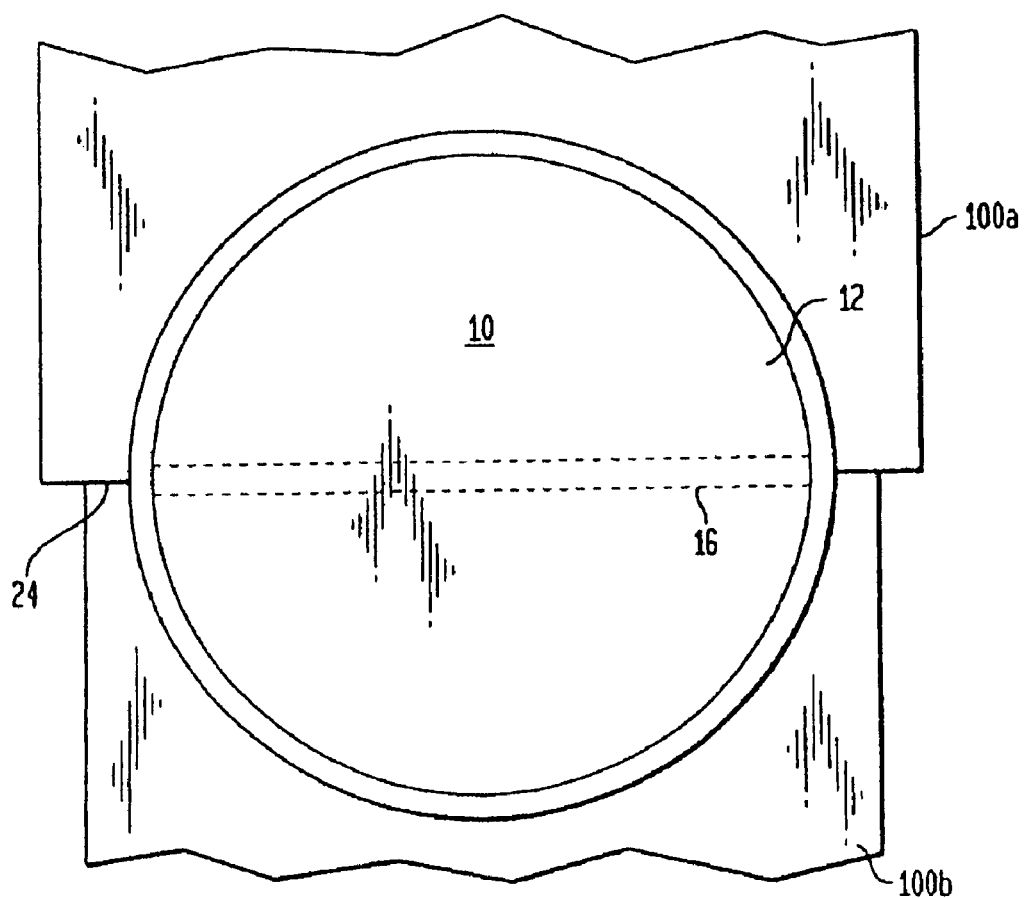
FIG. 8 illustrates a top view of a butt-joint patch secured in the joint formed by the overlapping membranes.

FIG. 8, illustrates butt joint patch 10 having a single rib 16 on its deck side positioned in a butt joint 24 formed by the intersection/overlapping of membrane 100a and 100b.

In still another embodiment there is provided a butt joint patch having a vacuum or injection molded membrane having a single rib 16 which segments the membrane into two sections of two different heights, each segment having the same thickness of butyl or other adhesive layer thereon, along with a release liner.

Figure 9:
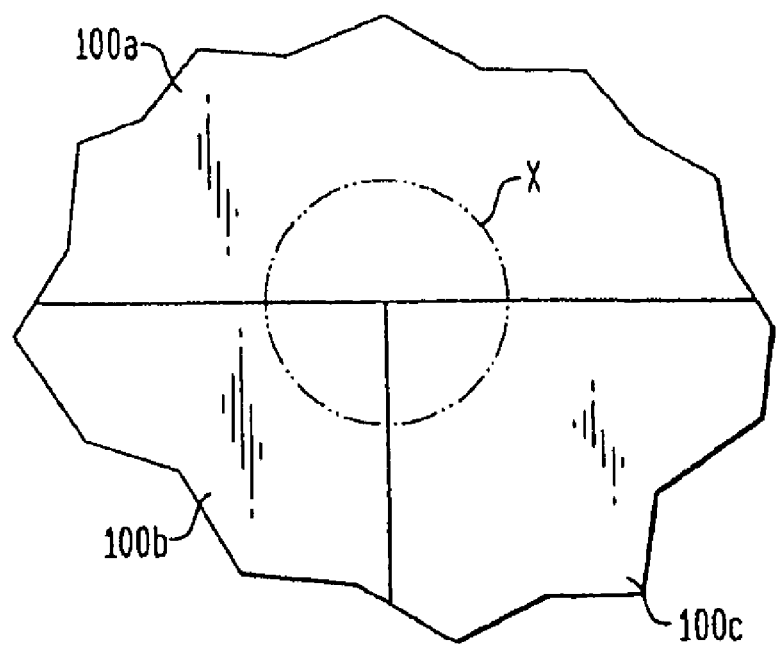
FIG. 9 depicts overlapping membranes forming a T-joint or void.
Figure 10:
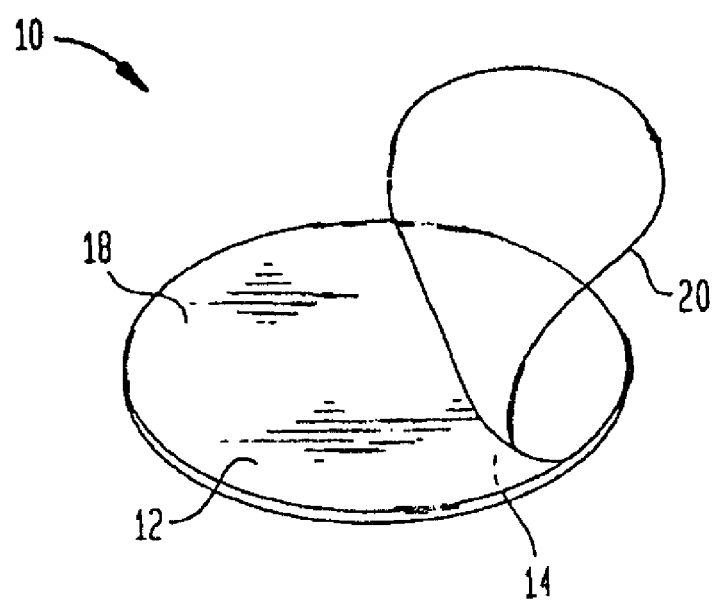
FIG. 10 is a perspective view of a T-joint patch in accordance with another embodiment of the present invention.

In FIG. 9, a T-joint is shown similar to the T join in FIG. 1. Another embodiment of the T-joint patch 10 is illustrated in FIG. 10. Patch 10 can be circular or oval. Patch 10 is planar and has a first side 12 (roof side) and a second side 14 (weather side). A layer of adhesive 18 such as a butyl rubber or other similar waterproofing adhesive layer is then coated on first side 12 of patch 10. A release liner 20 is then positioned on first side 12 of patch 10 and conforms to the shape of patch 10. Patch 10 is not limited to a circular or oval shape and may also be square or rectangular, or any other shape that may be desired.

In use, release liner 20 is peeled or removed from first side 12 of patch 10. Adhesive layer 18 on first side 12 of patch 10 secures side 12 of patch 10 to membranes 100a, 100b, 100c. To provide a watertight seal, pressure is usually applied to second side 14 of patch 10. Pressure may be applied by any known means, including the use of a roller or by applying pressure using one's hands. Heat may also be applied to second side 14 of patch 10 to provide a heat seal.

Figure 11:
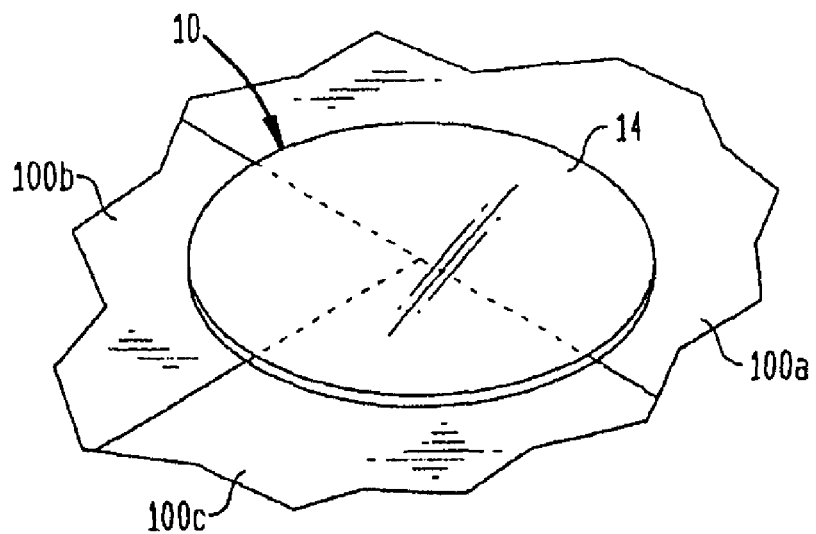
FIG. 11 illustrates a top view of the T-joint patch of FIG. 10 secured in the T-joint formed by the overlapping membranes.
Figure 12:
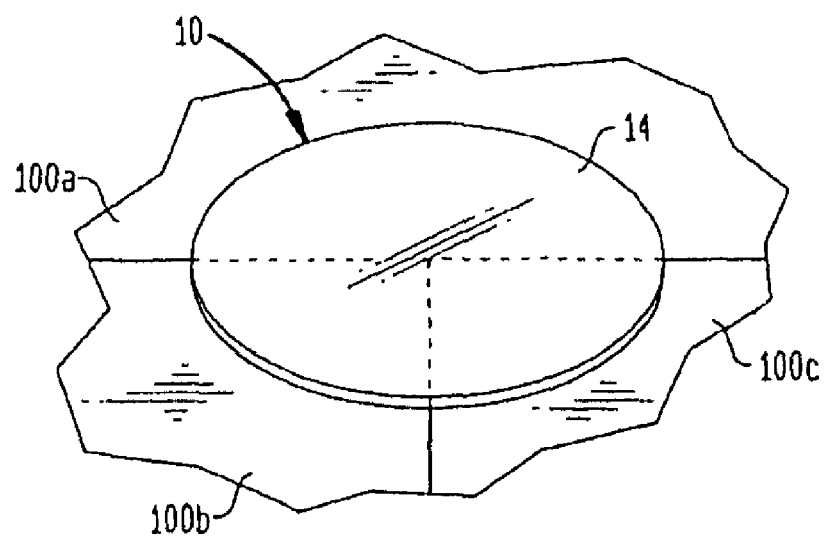
FIG. 12 illustrates another top view of the T-joint patch of FIG. 10 secured in the T-joint formed by the overlapping membranes.

FIGS. 11 and 12 illustrate patch 10 applied on membranes 100a, 100b, 100c. Adhesive layer 18 secures first side 12 of patch 10 to membranes 100a, 100b, 100c, leaving second side 14 as the exposed surface.

T-joint patch 10, in one embodiment, is a metallic foil ranging in diameter from approximately 3 inches to 9 inches, but the size of the patch is not limited in this respect. Examples of metallic foil form which patch 10 is formed include aluminum, copper, magnesium, zinc, nickel, tin, gold, silver, and alloys thereof, with thickness typically in the range of two to eight mils. The T-joint patch can be punched out of metallic sheet, or fabricated by other conventionally known methods, where the butyl or other type of adhesive compound and a release liner are either pre-applied to the sheet or other form on the first side 12 of patch 10.

In another embodiment, T-joint patch 10 is comprised of a metallic foil backed by a polymeric film, preferably a thermoplastic polymeric film, wherein the film thickness is proportional to the foil thickness, the film being made of polyethylene, polypropylene or similar polymer and where the film is bonded to the foil via heating or through other application such as applying a latex coating to the surface. The film thickness can range in gage from 0-4 mils but is not limited to this size. The butyl rubber or other adhesive compound 18 would then be applied to the polymeric film and backed by a release liner 20.

In yet another embodiment, the T-joint patch is comprised of a metallic foil that is colored, preferably in colors matching roof membrane colors, wherein the color is obtained via painting, dyeing, galvanizing, electroplating, anodizing, etching or other surface treatment applied to the metallic membrane. Alternatively, the color may be imparted by applying a colored polymeric film to the second side 14 of the metallic foil rather than or in addition to the polymeric film applied to the first side 12.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A roof joint patch, comprising:
    a flat section comprising a metallic foil, the flat section having a first side adapted to face the surface of a roofing membrane, and a second side opposite the first side;
    an adhesive waterproofing layer on the first side of the flat section;
    a release liner on the adhesive waterproofing layer; and
    one or more ribs positioned on the first side of the roof joint patch, which divide the first side of the roof joint patch into two or more sections.

2. The joint patch as recited in claim 1, wherein the flat section of the roof joint patch is circular, oval, square or rectangular in shape.

3. The joint patch as recited in claim 1, wherein the metallic foil comprises aluminum, copper, magnesium, zinc, nickel, tin, gold, silver or alloys thereof.

4. The joint patch as recited in claim 1, wherein the patch ranges in diameter from 3-9 inches.

5. The joint patch as recited in claim 1, wherein the metallic foil has a thickness ranging in size from 2-8 mils.

6. The joint patch as recited in claim 1, wherein the adhesive waterproofing is a butyl rubber.

7. The joint patch as recited in claim 6, wherein the adhesive waterproofing layer has an approximate thickness of 8-90 mils.

8. The joint patch as recited in claim 1, further comprising:
    a polymeric film layer between said flat section and said adhesive waterproofing layer.

9. The joint patch as recited in claim 8, wherein the polymeric film ranges in gage of up to approximately 4 mils.

10. The joint patch as recited in claim 8, wherein the polymeric film is a thermoplastic polymeric film.

11. The joint patch as recited in claim 8, wherein the polymeric film is made of a polyethylene, polypropylene or similar polymer.

12. The joint patch as recited in claim 8, wherein the metallic foil is colored.

13. The joint patch as recited in claim 1, wherein the metallic foil is colored.

* * * * *